United States Patent
Ren (10) Patent No.: US 9,473,677 B2
(45) Date of Patent: Oct. 18, 2016

(54) METHOD AND SERVER SYSTEM FOR SYNCHRONIZATION OF AUDIO/VIDEO MEDIA FILES

(71) Applicant: Wistron Corporation, New Taipei (TW)

(72) Inventor: Fei Ren, New Taipei (TW)

(73) Assignee: Wistron Corp., Hsinchu (TW)

( * ) Notice: Subject to any disclaimer, the term of this patent is extended or adjusted under 35 U.S.C. 154(b) by 151 days.

(21) Appl. No.: 14/605,516

(22) Filed: Jan. 26, 2015

(65) Prior Publication Data

US 2015/0341528 A1 Nov. 26, 2015

(30) Foreign Application Priority Data

May 22, 2014 (CN) .......................... 2014 1 0220043

(51) Int. Cl.
*H04N 5/04* (2006.01)
*H04L 29/06* (2006.01)
*H04N 21/8547* (2011.01)
*H04N 21/43* (2011.01)
*H04N 21/61* (2011.01)
*H04N 21/6437* (2011.01)

(52) U.S. Cl.
CPC .............. *H04N 5/04* (2013.01); *H04L 65/608* (2013.01); *H04L 69/28* (2013.01); *H04N 21/4307* (2013.01); *H04N 21/6125* (2013.01); *H04N 21/6437* (2013.01); *H04N 21/8547* (2013.01)

(58) Field of Classification Search
None
See application file for complete search history.

(56) References Cited

U.S. PATENT DOCUMENTS

| 7,710,943 | B2 | 5/2010 | Seo et al. |
| 9,088,635 | B2* | 7/2015 | Zhou .................... H04N 21/632 |
| 2011/0063502 | A1* | 3/2011 | Legallais ........... G11B 27/3027 348/495 |
| 2011/0083155 | A1* | 4/2011 | De Nijs ................. H04H 20/40 725/116 |

FOREIGN PATENT DOCUMENTS

| CN | 1738437 A | 2/2006 |
| CN | 102377823 A | 3/2012 |

OTHER PUBLICATIONS

The Office Action issued to Taiwanese Counterpart Application No. 103119079 by the Taiwan Intellectual Property Office on Jan. 29, 2016 along with an English translation of sections boxed in red.

* cited by examiner

*Primary Examiner* — Hong Cho
(74) *Attorney, Agent, or Firm* — Brinks Gilson & Lione; John C. Bacoch (57) ABSTRACT

A method for synchronization of audio/video (AV) media files includes: writing respectively AV real-time transport protocol (RTP) packets and AV real-time transport control protocol (RTCP) packets into AV buffers; obtaining respectively timestamps in first ones of AV RTCP packets to serve as absolute start times of first ones of the AV RTP packets, and AV timestamp differences between the timestamps of adjacent ones of the AV RTP packets; generating respectively playback timestamps of the AV RTP packets according to the AV timestamp differences in combination with the absolute start times; and writing the AV RTP packets in combination with the playback timestamps of the AV RTP packets into a media file.

19 Claims, 6 Drawing Sheets

METHOD AND SERVER SYSTEM FOR SYNCHRONIZATION OF AUDIO/VIDEO MEDIA FILES

CROSS-REFERENCE TO RELATED APPLICATION

This application claims priority of Chinese Application No. 201410220043.0, filed on May 22, 2014, the entire disclosure of which is incorporated herein by reference.

FIELD OF THE INVENTION

The present invention relates to synchronization of audio/video (AV) media files, more particularly to a method and a server system for synchronization of the AV media files based on a browser.

BACKGROUND OF THE INVENTION

A conventional application (APP) capable of synchronizing audio/video (AV) media files is typically applied nowadays to combine at least one image (or a screenshot) and a separately-recorded audio content (or a track) into a multimedia file formatted as (.rmvb) or (.mp4). This technique for synchronization of AV media files is suitable for producing educational materials, such as instructional materials associated with computer operation, which particularly reinforces comprehension of a learner by way of simultaneous receipt of a visual presentation and an acoustic interpretation.

However, the conventional way of creating the multimedia file using the abovementioned APP must be implemented on an electronic device that is compatible with the APP and that has the APP installed thereon.

SUMMARY OF THE INVENTION

Therefore, an object of the present invention is to provide a method for synchronization of audio/video media files that may alleviate the above drawback of the prior art.

Accordingly, a method for synchronization of audio/video (AV) media files of the present invention is to be implemented by a server system that is configured for enabling a client device executing a browser to connect thereto.

The method comprises the steps of:

(A) receiving, by the server system, from the client device in a manner of data streaming, a plurality of audio real-time transport protocol (RTP) packets and audio real-time transport control protocol (RTCP) packets corresponding to an audio media file, and a plurality of video RTP packets and video RTCP packets corresponding to a video media file;

(B) writing, by the server system, the audio RTP packets received in Step (A) into an audio buffer, and the video RTP packets received in Step (A) into a video buffer;

(C) obtaining, by the server system, a timestamp contained in a first one of the audio RTCP packets to serve as an absolute start time of a first one of the audio RTP packets, and a timestamp contained in a first one of the video RTCP packets to serve as an absolute start time of a first one of the video RTP packets;

(D) obtaining, by the server system, an audio timestamp difference between a timestamp of one of the audio RTP packets retrieved from a queue of the audio buffer and a timestamp of a preceding one of the audio RTP packets in the queue of the audio buffer, and a video timestamp difference between a timestamp of one of the video RTP packets retrieved from a queue of the video buffer and a timestamp of a preceding one of the video RTP packets in the queue of the video buffer;

(E) generating, by the server system, a playback timestamp of said one of the audio RTP packets according to the audio timestamp difference obtained in Step (D) in combination with the absolute start time of the first one of the audio RTP packets, and a playback timestamp of said one of the video RTP packets according to the video timestamp difference obtained in Step (D) in combination with the absolute start time of the first one of the video RTP packets; and (F) writing, by the server system, said one of the audio RTP packets in combination with the playback timestamp of said one of the audio RTP packets, and said one of the video RTP packets in combination with the playback timestamp of said one of the video RTP packets into a media file.

Another object of the present invention is to provide a server system for synchronization of audio/video (AV) media files that may alleviate the above drawbacks of the prior art.

Accordingly, a server system of the present invention is configured for enabling a client device executing a browser to connect thereto. The server system comprises a web server, a multipoint control unit (MCU) and a media file synchronizing server.

The web server is configured to enable connection of the client device. The MCU is configured to receive, from the client device in a manner of data streaming, a plurality of audio real-time transport protocol (RTP) packets and audio real-time transport control protocol (RTCP) packets corresponding to an audio media file, and a plurality of video RTP packets and video RTCP packets corresponding to a video media file. The MCU is further configured to write the audio RTP packets and the video RTP packets into an audio buffer and a video buffer, respectively.

The media file synchronizing server is configured to:

obtain a timestamp contained in a first one of the audio RTCP packets to serve as an absolute start time of a first one of the audio RTP packets, and a timestamp contained in a first one of the video RTCP packets to serve as an absolute start time of a first one of the video RTP packets;

obtain an audio timestamp difference between a timestamp of one of the audio RTP packets retrieved from a queue of the audio buffer and a timestamp of a preceding one of the audio RTP packets in the queue of the audio buffer, and a video timestamp difference between a timestamp of one of the video RTP packets retrieved from a queue of the video buffer and a timestamp of a preceding one of the video RTP packets in the queue of the video buffer;

generate a playback timestamp of said one of the audio RTP packets according to the audio timestamp difference in combination with the absolute start time of the first one of the audio RTP packets, and a playback timestamp of said one of the video RTP packets according to the video timestamp difference in combination with the absolute start time of the first one of the video RTP packets; and write said one of the audio RTP packets in combination with the playback timestamp of said one of the audio RTP packets, and said one of the video RTP packets in combination with the playback timestamp of said one of the video RTP packets into a media file.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
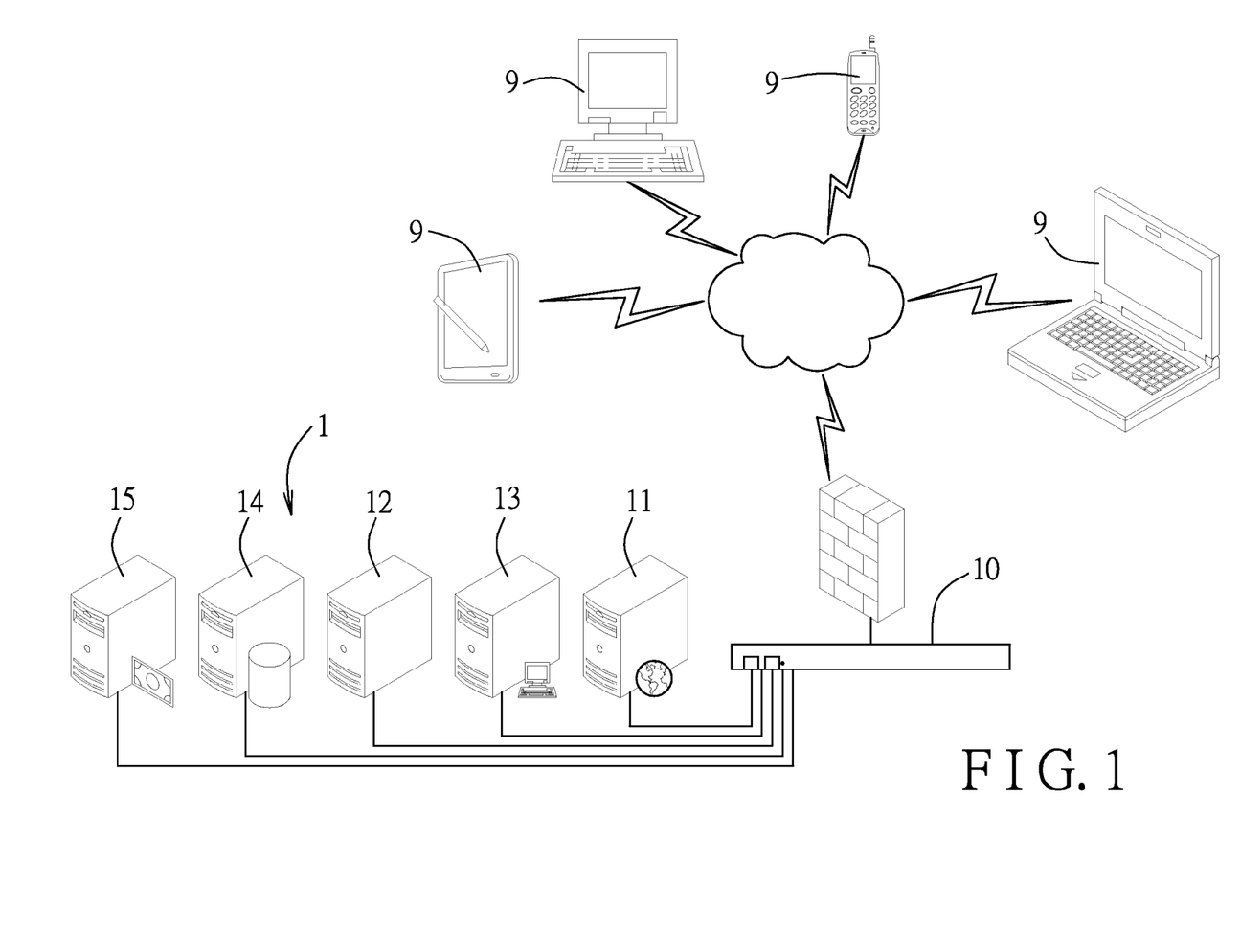
FIG. 1 is a schematic diagram of an embodiment of a server system according to the present invention.
Figure 2:
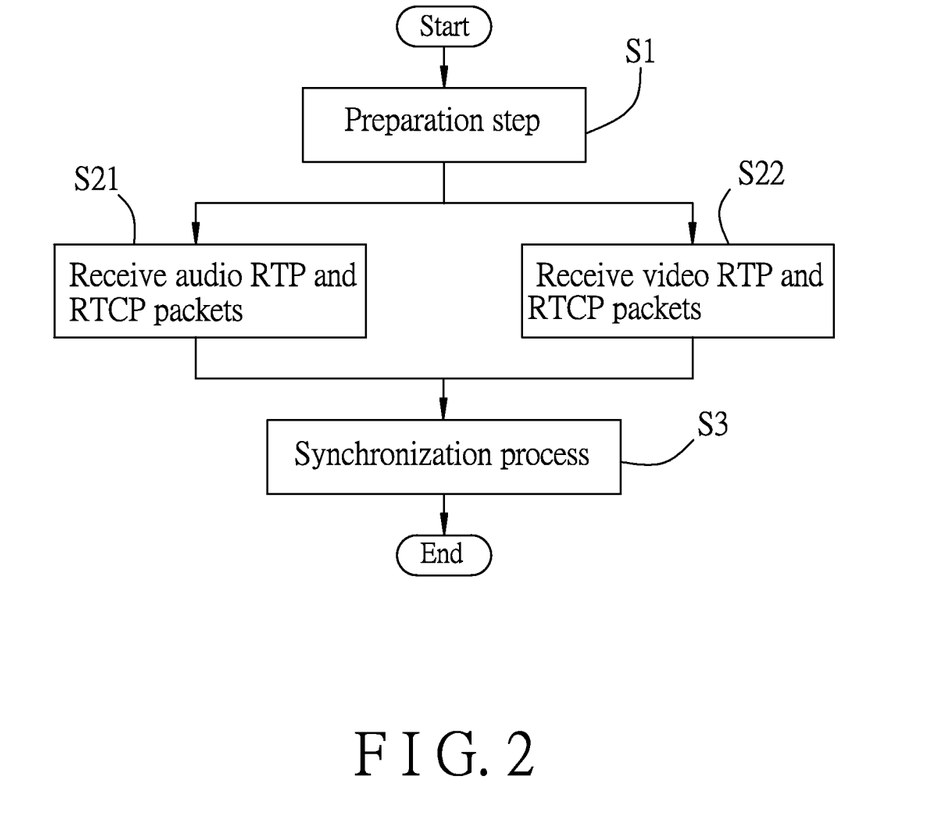
FIG. 2 is a flow chart illustrating an embodiment of a method for synchronization of audio/video (AV) media files according to the present invention.

Referring to FIGS. 1 and 2, an embodiment of a method for synchronization of audio/video (AV) media files according to the present invention is applicable to produce instructional material of information technology (IT). For example, to create a multimedia file that contains images of operational process and corresponding commentary, a user may synchronize a video media file obtained by capturing a series of screenshots and an audio media file obtained by recording a period of voice commentary via a client device 9 (e.g., a computer, a tablet, a smart phone, etc.) executing a browser that supports the HTML5 standard.

An embodiment of the method for synchronization of AV media files is implemented by a server system 1. The server system 1 of this embodiment includes a web server 11, a multipoint control unit 12 (known as MCU), an MCU administrator 13, a storage device 14 and a media file synchronizing server 15 that are connected to each other through a switch 10.

The web server 11 is adapted to enable the client device 9 that executes the browser to connect thereto.

A preparation step (S1) shown in FIG. 2 is executed prior to implementing the embodiment of the method for synchronization of the AV media files. In Step (S1), the user logs in, via the browser executed by the client device 9, to a homepage (not shown) that has a web address linking to the web server 11. By virtue of Web Real-time Communication (WebRTC) technique of the HTML5 standard, the client device 9 may directly visit the web server 11 via the browser to encode video data (such as a series of images or captured screenshots) into the video media file (in a format of MPEG, H.264, etc.), and to encode audio data (such as a period of voice commentary or a recorded track) into the audio media file (in a format of PCM, WAV, MP3, etc.). In particular, when the user agrees to share the AV media files via the homepage, the browser enables the client device 9 to pack the AV media files into AV Real-time Transport Protocol (RTP) packets and AV Real-time Transport Control Protocol (RTCP) packets. The AV RTP packets and the AV RTCP packets are sent to the MCU 12. Each of the AV RTP packets includes load data and a RTP header that includes a sequence number and a timestamp. Since the RTCP is used to monitor transmission status and Quality of Service (QoS), the RTCP packets are sent periodically and include informational statistics such as numbers of sent packets and lost packets, etc.

The MCU 12 in this embodiment is a computer cluster consisting of a set of connected computers (not shown) that are deployed to improve performance of transmission and receipt of the massive amount of data.

The MCU administrator 13 is configured to distribute assignment of receipt and management of stream data of the MCU 12. Specifically, the MCU administrator 13 collects information as to condition of the MCU 12 and assigns different tasks to different computers based on a principle of load-balancing, in which the computers share computational workload to provide better overall performance such that the overall response time of the computer cluster may be optimized.

The storage device 14 is a shared storage device of the web server 11, the MCU 12 and the media file synchronizing server 15. The storage device 14 is for storing recorded media files and temporary files.

The media file synchronizing server 15 is configured to execute the main part of the method for synchronization of the AV media files of this embodiment. In particular, the media file synchronizing server 15 decodes the AV RTP packets and the AV RTCP packets that are received by the MCU 12, synchronizes the AV media files to result in the multimedia file, and stores the multimedia file into the storage device 14.

The embodiment of the method for synchronization of AV media files according to the present invention as shown in FIG. 2 includes the following steps of:

Step (S21), in which the MCU 12 receives, from the client device 9 in a manner of data streaming, the audio RTP packets and the audio RTCP packets that correspond to the audio media file;

Step (S22), in which the MCU 12 receives, from the client device 9 in the manner of data streaming, the video RTP packets and the video RTCP packets that correspond to the video media file; and Step (S3), in which the media file synchronizing server 15 performs the process of synchronization.

The Step (S21) is parallel to the Step (S22) in execution as shown in FIG. 2. A detailed description of Step (S21) will be further illustrated with reference to accompanying FIGS. 3 and 4 hereinafter, and a detailed description of the synchronization process (S3) will also be illustrated afterward with reference to accompanying FIGS. 5 to 7.

Figure 3:
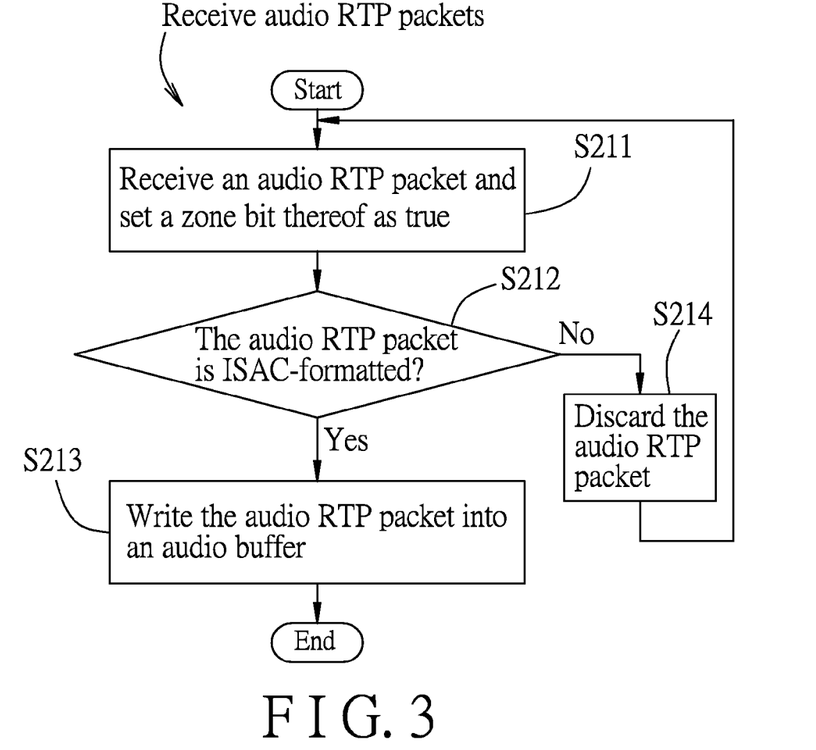
FIG. 3 is a flow chart for illustrating a workflow of receiving and processing audio real-time transport protocol (RTP) packets according to the embodiment.
Figure 4:
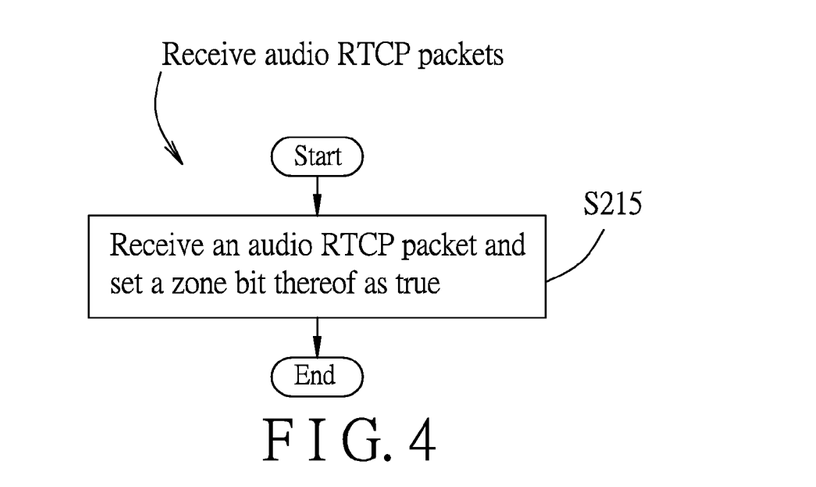
FIG. 4 is a flow chart for illustrating a workflow of receiving and processing audio real-time transport control protocol (RTCP) packets according to the embodiment.

Since the Step (S22) can be deduced from the Step (S21), a detailed description of Step (S22) will be omitted for the sake of brevity. The Step (S21) includes parallel steps of: receiving the audio RTP packets as shown in FIG. 3; and receiving the audio RTCP packets as shown in FIG. 4.

The step of receiving the audio RTP packets includes the following steps of:

Step (S211), in which the MCU 12 receives the audio RTP packet from the client device 9 and sets a zone bit thereof as TRUE;

Step (S212), in which the MCU 12 determines whether the audio RTP packet received from the client device 9 conforms with an Internet Speech Audio Code (ISAC) format;

Step (S213), in which the MCU 12 writes the audio RTP packet received from the client device 9 into an audio buffer according to the sequence number contained in the RTP packet when the determination made in Step (S212) is affirmative; and Step (S214), in which the MCU 12 discards the audio RTP packet when the determination made in Step (S212) is negative.

It can be deduced that the MCU 12, on the other hand, writes the video RTP packet received from the client device 9 into a video buffer in a step (not shown) that corresponds to Step (S213). It is understood that the ISAC format mentioned earlier is preferably a wideband speech codec developed by Global IP Solutions (GIPS).

Specifically, in this embodiment, the buffer is a list having a plurality of queues. Each of the queues stores one RTP packet. Each time the MCU 12 receives one RTP packet, the RTP packet is stored into one of the storage units of the buffer according to the sequence number of the RTP packet. As a result, the RTP packets are ensured to be arranged sequentially according to their sequence numbers in the buffer. In this embodiment, the audio buffer is designed for 1024 packets to be written therein since an amount of the audio data is comparatively smaller. The video buffer is designed for 5*1024 packets to be written therein since an amount of the video data is comparatively greater.

The step of receiving the audio RTCP packets includes the following step of: Step (S215), in which the MCU 12 receives the audio RTCP packet from the client device 9 and sets a zone bit thereof as TRUE.

Figure 5:
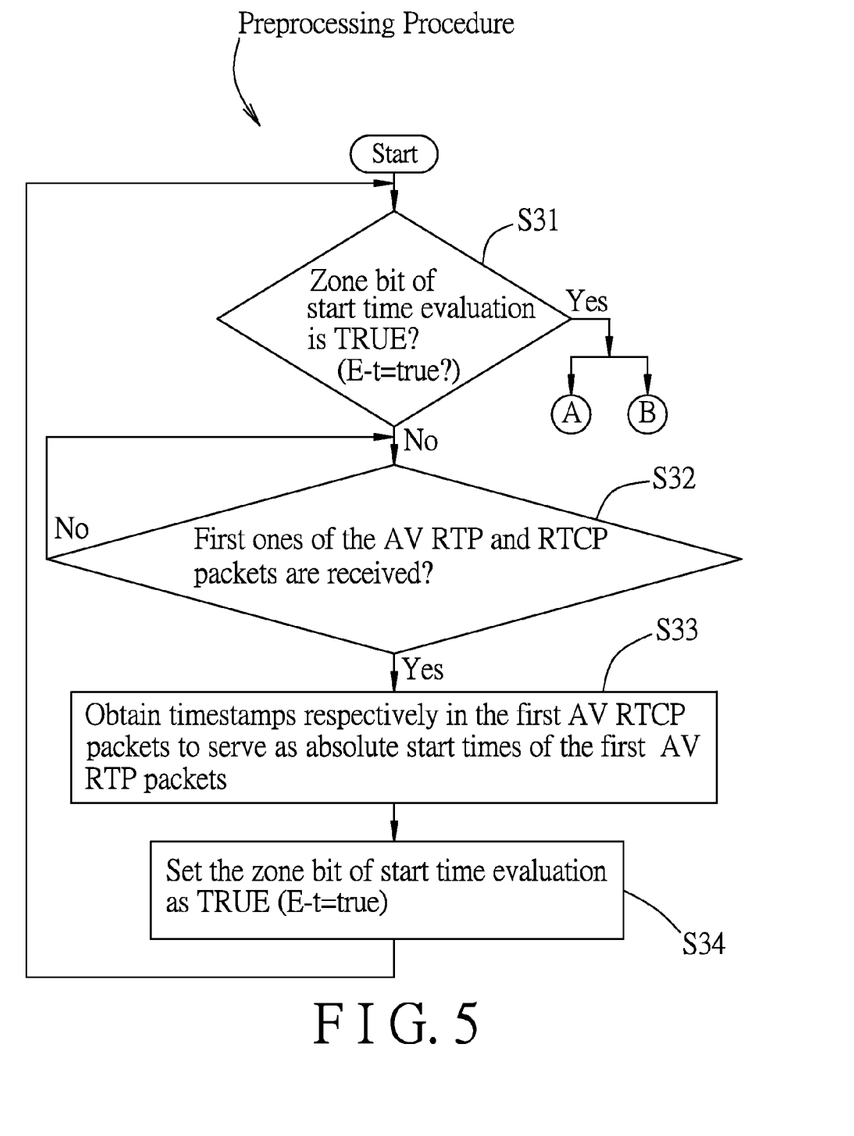
FIG. 5 is a flow chart for illustrating a workflow of a preprocessing procedure that is implemented before synchronization of the AV media files according to the embodiment.

Referring to FIG. 5, a preprocess procedure is implemented by the media file synchronizing server 15 before the synchronization of the AV media files to ensure that a start time of the audio media file and a start time of the video media file have been determined. The preprocessing procedure includes the following steps of:

Step (S31), in which the media file synchronizing server 15 determines whether a zone bit of start time evaluation is set TRUE (E-t=true). The flow proceeds to Step (S32) when a result of the determination made in Step (S31) is negative;

Step (S32), in which the media file synchronizing server 15 determines whether a first one of the audio RTP packets (which has been written into the audio buffer), a first one of the audio RTCP packets, a first one of the video RTP packets (which has been written into the video buffer), and a first one of the video RTCP packets are received;

The flow goes back to Step (S32) when a result of the determination made in Step (S32) is negative;

Step (S33), in which the media file synchronizing server 15 obtains a timestamp contained in the first one of the audio RTCP packets to serve as an absolute start time of the first one of the audio RTP packets, and a timestamp contained in the first one of the video RTCP packets to serve as an absolute start time of the first one of the video RTP packets when the result of the determination made in Step (S32) is affirmative; and Step (S34), in which the media file synchronizing server 15 sets the zone bit of start time evaluation as TRUE (E-t=true).

The timestamp contained in the RTCP packet is an absolute time, and the timestamp contained in the RTP packet is a relative time obtained by sampling frequency calculation. For example, if a video sampling frequency is 9000 times per second, a single unit will be equal to 1/9000 second. Therefore, in actual implementation of the synchronization process, a playback timestamp should be generated on the basis of the absolute time of the RTCP packet in combination with the relative time of the RTP packet.

Figure 6:
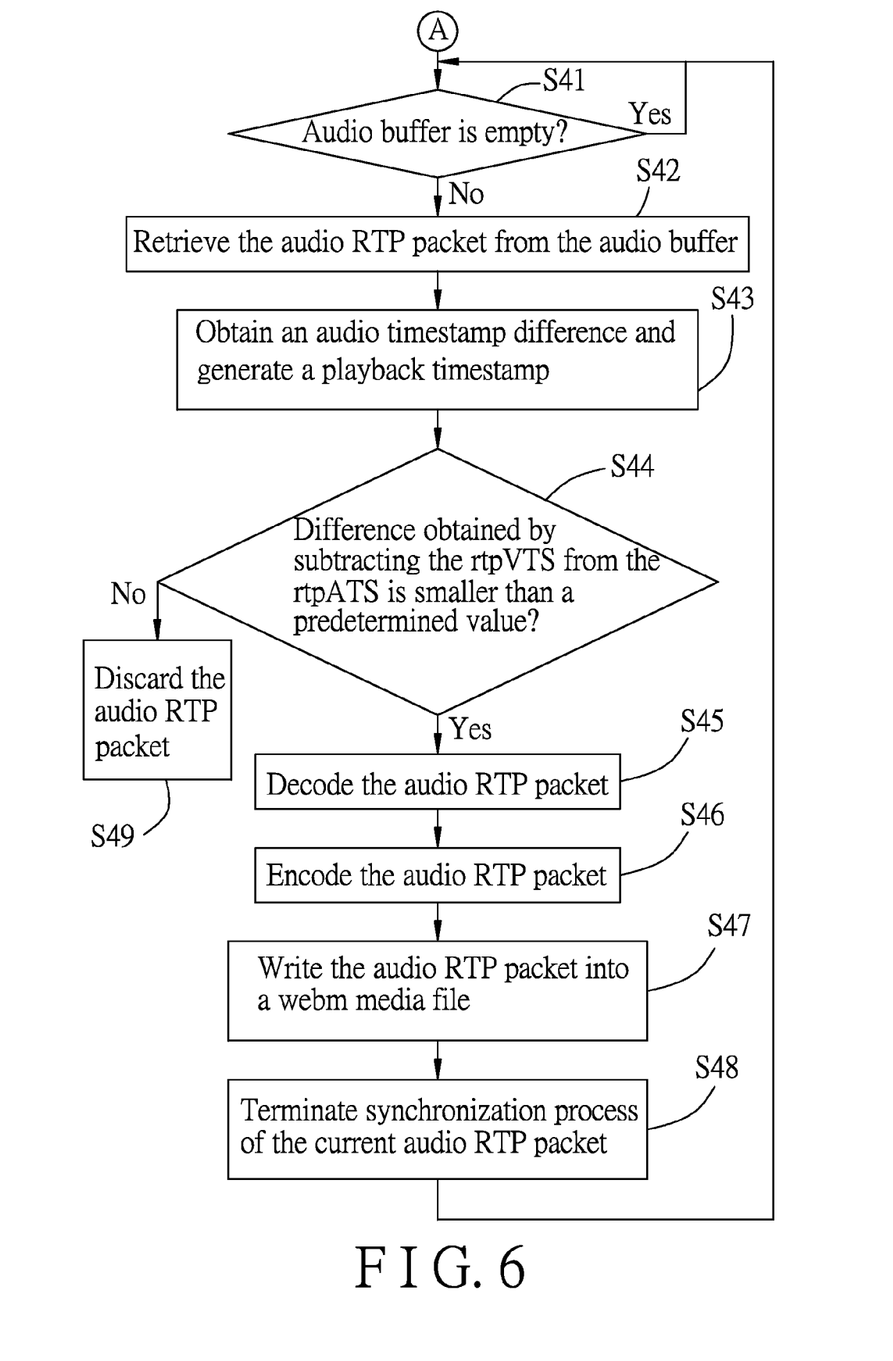
FIG. 6 is a flow chart for illustrating a workflow of synchronization of the audio media files according to the embodiment.
Figure 7:
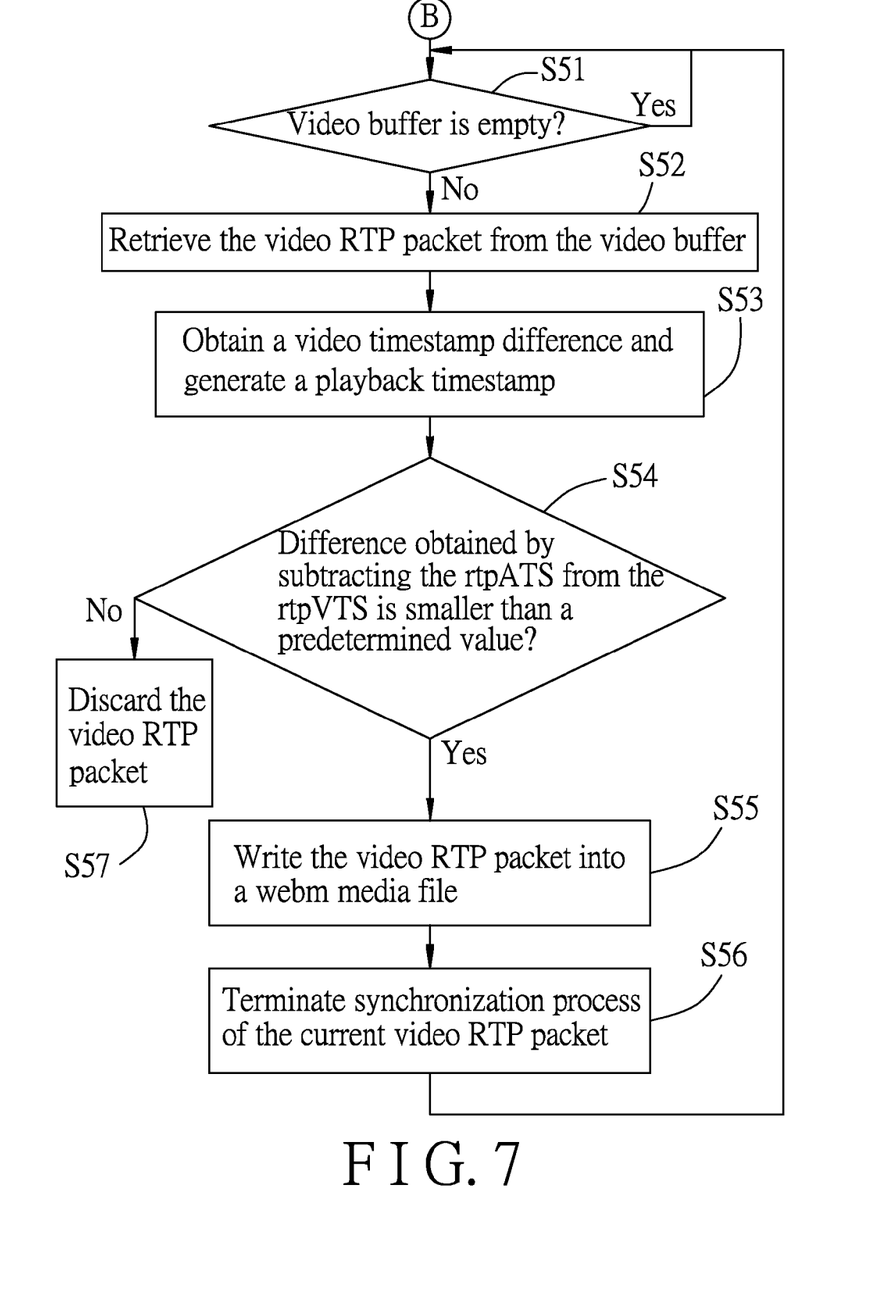
FIG. 7 is a flow chart for illustrating a workflow of synchronization of the video media files according to the embodiment.

Referring to FIGS. 6 and 7, when the determination made in Step (S31) is affirmative, the synchronization process of the audio media files shown in FIG. 6 and the synchronization process of the video media files shown in FIG. 7 are respectively executed and may be executed at the same time.

The synchronization process of the audio media files includes the following steps of:

Step (S41), in which the media file synchronizing server 15 determines whether the audio buffer is empty;

The flow goes back to Step (S41) when a result of the determination made in Step (S41) is affirmative;

Step (S42), in which the media file synchronizing server 15 retrieves the audio RTP packet from the queue of the audio buffer when the result of the determination made in Step (S41) is negative;

Step (S43), in which the media file synchronizing server 15 obtains an audio timestamp difference between a timestamp of the audio RTP packet retrieved from the queue of the audio buffer and a timestamp of a preceding one of the audio RTP packets in the queue of the audio buffer, and generates a playback timestamp of the audio RTP packet according to the audio timestamp difference in combination with the absolute start time of the first one of the audio RTP packets;

Step (S44), in which the media file synchronizing server 15 determines whether a difference obtained by subtracting the playback timestamp of the video RTP packet (represented as rtpVTS hereinafter) from the playback timestamp of the audio RTP packet (represented as rtpATS hereinafter) is smaller than a predetermined value. The audio and video contents are synchronized when a result of the determination made in Step (S44) is affirmative, and the flow proceeds to Step (S45);

Step (S45), in which the media file synchronizing server 15 decodes the ISAC-formatted audio RTP packet when the result of the determination made in Step (S44) is affirmative;

Step (S46), in which the media file synchronizing server 15 encodes the audio RTP packet into a vorbis-formatted audio RTP packet;

Step (S47), in which the media file synchronizing server 15 writes the vorbis-formatted audio RTP packet in combination with the playback timestamp thereof into a webm media file;

Step (S48), in which the media file synchronizing server 15 terminates the synchronization process of the current audio RTP packet, the timestamp of the current audio RTP packets serves as the timestamp of the preceding one of the audio RTP packets in the queue of the audio buffer, and the flow goes back to Step (S41) for synchronization process of a succeeding one of the audio RTP packets; and Step (S49), in which the media file synchronizing server 15 discards the audio RTP packet when the difference obtained in Step (S44) by subtracting the rtpVTS from the rtpATS is not smaller than the predetermined value.

The main purpose of the Step (S43) is to assign an absolute playback time to each of the audio RTP packets. For instance, since the absolute start time of the first audio RTP packet is set, the audio timestamp difference between the timestamp of the second audio RTP packet and the timestamp of the first audio RTP packet can be added to the audio absolute start time to serve as a playback timestamp of the second audio RTP packet. Similarly, playback timestamps of the third, fourth and others of the audio RTP packets may also be obtained through the abovementioned calculation.

It is understood that an audio encoding format of the webm media file is vorbis-formatted, and a video encoding format of the webm media file is VP8-formatted. However, the WebRTC does not support the vorbis audio encoding format. Thus, the Steps (S45, S46) should be performed before the audio RTP packet and the playback timestamp thereof are written into the webm media file. Nevertheless, in the case of synchronizing the video media file which is to be illustrated as follows, the WebRTC supports the video encoding format of the webm media file such that processes of decoding and encoding the video RTP packet may be omitted.

The synchronization process of the video media files includes the following steps of:

Step (S51), in which the media file synchronizing server 15 determines whether the video buffer is empty;

The flow goes back to Step (S51) when a result of the determination made in Step (S51) is affirmative;

Step (S52), in which the media file synchronizing server 15 retrieves the video RTP packet from the queue of the video buffer when the result of the determination made in Step (S51) is negative;

Step (S53), in which the media file synchronizing server 15 obtains a video timestamp difference between a timestamp of the video RTP packet retrieved from the queue of the video buffer and a timestamp of a preceding one of the video RTP packets in the queue of the video buffer, and generates a playback timestamp of the video RTP packet according to the video timestamp difference in combination with the absolute start time of the first one of the video RTP packets;

Step (S54), in which the media file synchronizing server 15 determines whether a difference obtained by subtracting the playback timestamp of the audio RTP packet (represented as rtpATS hereinafter) from the playback timestamp of the video RTP packet (represented as rtpVTS hereinafter) is smaller than a predetermined value. The audio and video contents are synchronized when a result of the determination made in Step (S54) is affirmative, and the step proceeds to Step (S55);

Step (S55), in which the media file synchronizing server 15 writes the video RTP packet in combination with the playback timestamp thereof into the webm media file;

Step (S56), in which the media file synchronizing server 15 terminates the synchronization process of the current video RTP packet, the timestamp of the current video RTP packets serves as the timestamp of the preceding one of the video RTP packets in the queue of the video buffer, and the flow goes back to Step (S51) for synchronization process of a succeeding one of the video RTP packets; and Step (S57), in which the media file synchronizing server 15 discards the video RTP packet when the difference obtained in Step (S54) by subtracting the rtpATS from the rtpVTS is not smaller than the predetermined value.

When all the audio RTP packets and the video RTP packets have been processed by the abovementioned synchronization steps, the synchronization of webm media files is completed. In this embodiment, the webm media file conforms to the MKV video file format.

To conclude, the method of synchronization of AV media files according to the present invention is implemented under the HTML5 standard that supports webpage instant messaging technique such that conventional compatibility issues may be overcome. Moreover, by comparing the AV timestamp differences with the predetermined value, the AV media file may be precisely synchronized. Furthermore, by virtue of the present invention, the AV packets are ensured to be written in sequence according to the actual timestamps thereof.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for synchronization of audio/video (AV) media files, the method to be implemented by a server system that is configured for enabling a client device executing a browser to connect thereto, the method comprising the steps of:
(A) receiving, by the server system, from the client device in a manner of data streaming,
a plurality of audio real-time transport protocol (RTP) packets and audio real-time transport control protocol (RTCP) packets corresponding to an audio media file, and
a plurality of video RTP packets and video RTCP packets corresponding to a video media file;
(B) obtaining, by the server system, a timestamp contained in a first one of the audio RTCP packets to serve as an absolute start time of a first one of the audio RTP packets, and a timestamp contained in a first one of the video RTCP packets to serve as an absolute start time of a first one of the video RTP packets;
(C) obtaining, by the server system,
an audio timestamp difference between a timestamp of one of the audio RTP packets and a timestamp of a preceding one of the audio RTP packets, and
a video timestamp difference between a timestamp of one of the video RTP packets and a timestamp of a preceding one of the video RTP packets;
(D) generating, by the server system,
a playback timestamp of said one of the audio RTP packets according to the audio timestamp difference obtained in Step (C) in combination with the absolute start time of the first one of the audio RTP packets, and
a playback timestamp of said one of the video RTP packets according to the video timestamp difference obtained in Step (C) in combination with the absolute start time of the first one of the video RTP packets; and
(E) writing, by the server system, said one of the audio RTP packets in combination with the playback timestamp of said one of the audio RTP packets, and said one of the video RTP packets in combination with the playback timestamp of said one of the video RTP packets into a media file.

2. The method according to claim 1, further comprising, subsequent to Step (D), the step of:
(F) determining, by the server system, whether a difference obtained by subtracting the playback timestamp of said one of the video RTP packets from the playback timestamp of said one of the audio RTP packets is smaller than a predetermined value; and
wherein, in step (E), said one of the audio RTP packets together with the playback timestamp thereof is written into the media file when it is determined in Step (F) that the difference is smaller than the predetermined value.

3. The method according to claim 2, wherein, in step (E), the server system discards said one of the audio RTP packets when it is determined in Step (F) that the difference is not smaller than the predetermined value.

4. The method according to claim 1, further comprising, subsequent to Step (D), the step of:
(G) determining, by the server system, whether a difference obtained by subtracting the playback timestamp of said one of the audio RTP packets from the playback timestamp of said one of the video RTP packets is smaller than a predetermined value; and wherein, instep (E), said one of the video RTP packets together with the playback timestamp thereof is written into the media file when it is determined in Step (G) that the difference is smaller than the predetermined value.

5. The method according to claim 4, wherein, in step (E), the server system discards said one of the video RTP packets when it is determined in Step (G) that the difference is not smaller than the predetermined value.

6. The method according to claim 1, further comprising, subsequent to Step (A), the step of:
(H) writing, by the server system, the audio RTP packets received in Step (A) into an audio buffer, and the video RTP packets received in Step (A) into a video buffer;
wherein, instep (C), said one of the audio RTP packets is retrieved from a queue of the audio buffer and the preceding one of the audio RTP packets is in the queue of the audio buffer, and said one of the video RTP packets is retrieved from a queue of the video buffer and the preceding one of the video RTP packets is in the queue of the video buffer.

7. The method according to claim 6, wherein the audio buffer includes a plurality of storage units, each of the storage units of the audio buffer being configured to store one of the audio RTP packets, and
in step (H), each time one of the audio RTP packets is received by the server system, the server system writes said one of the audio RTP packets into one of the storage units of the audio buffer based on a sequence number of said one of the audio RTP packets in such a way that the audio RTP packets are arranged sequentially in the audio buffer.

8. The method according to claim 6, wherein the video buffer includes a plurality of storage units, each of the storage units of the video buffer being configured to store one of the video RTP packets, and
in step (H), each time one of the video RTP packets is received by the server system, the server system writes said one of the video RTP packets into one of the storage units of the video buffer based on a sequence number of said one of the video RTP packets in such a way that the video RTP packets are arranged sequentially in the video buffer.

9. The method according to claim 6, further comprising, prior to Step (H), the steps of:
determining, by the server system, whether the audio RTP packets received in step (A) conform to an internet speech audio codec (ISAC) format; and
discarding, by the server system, the audio RTP packets that do not conform with the ISAC format.

10. The method according to claim 1, wherein the audio RTP packets are retrieved from a queue of an audio buffer, and the video RTP packets are retrieved from a queue of a video buffer.

11. A server system for synchronization of audio/video (AV) media files, said server system being configured for enabling a client device executing a browser to connect thereto, and comprising:
a web server that is configured to enable connection of the client device;
a multipoint control unit (MCU) that is configured to receive, from the client device in a manner of data streaming, a plurality of audio real-time transport protocol (RTP) packets and audio real-time transport control protocol (RTCP) packets corresponding to an audio media file, and a plurality of video RTP packets and video RTCP packets corresponding to a video media file; and
a media file synchronizing server that is configured to
obtain a timestamp contained in a first one of the audio RTCP packets to serve as an absolute start time of a first one of the audio RTP packets, and a timestamp contained in a first one of the video RTCP packets to serve as an absolute start time of a first one of the video RTP packets,
obtain an audio timestamp difference between a timestamp of one of the audio RTP packets and a time stamp of a preceding one of the audio RTP packets, and a video timestamp difference between a timestamp of one of the video RTP packets and a timestamp of a preceding one of the video RTP packets,
generate a playback timestamp of said one of the audio RTP packets according to the audio timestamp difference in combination with the absolute start time of the first one of the audio RTP packets, and a playback timestamp of said one of the video RTP packets according to the video timestamp difference in combination with the absolute start time of the first one of the video RTP packets, and
write said one of the audio RTP packets in combination with the playback timestamp of said one of the audio RTP packets, and said one of the video RTP packets in combination with the playback timestamp of said one of the video RTP packets into a media file.

12. The server system according to claim 11, wherein said media file synchronizing server is further configured to determine whether a difference obtained by subtracting the playback timestamp of said one of the video RTP packets from the playback timestamp of said one of the audio RTP packets is smaller than a predetermined value, and
wherein said one of the audio RTP packets together with the playback timestamp thereof is written into the media file when it is determined that the difference is smaller than the predetermined value.

13. The server system according to claim 12, wherein said media file synchronizing server discards said one of the audio RTP packets when it is determined that the difference is not smaller than the predetermined value.

14. The server system according to claim 11, wherein said media file synchronizing server is further configured to determine whether a difference obtained by subtracting the playback timestamp of said one of the audio RTP packets from the playback timestamp of said one of the video RTP packets is smaller than a predetermined value, and
wherein said one of the video RTP packets together with the playback timestamp thereof is written into the media file when it is determined that the difference is smaller than the predetermined value.

15. The server system according to claim 14, wherein said media file synchronizing server discards said one of the video RTP packets when it is determined that the difference is not smaller than the predetermined value.

16. The server system according to claim 11
wherein said MCU is further configured to write the audio RTP packets and the video RTP packets into an audio buffer and a video buffer, respectively; and
wherein said one of the audio RTP packets is retrieved from a queue of the audio buffer and the preceding one of the audio RTP packets is in the queue of the audio buffer, and said one of the video RTP packets is retrieved from a queue of the video buffer and the preceding one of the video RTP packets is in the queue of the video buffer.

17. The server system according to claim 16, wherein the audio buffer including a plurality of storage units, each of the storage units of the audio buffer being configured to store one of the audio RTP packets, and each time one of the audio RTP packets is received by said MCU, said MCU writes said one of the audio RTP packets into one of the storage units of the audio buffer based on a sequence number of said one of the audio RTP packets in such a way that the audio RTP packets are arranged sequentially in the audio buffer.

18. The server system according to claim 16, wherein the video buffer including a plurality of storage units, each of the storage units of the video buffer being configured to store one of the video RTP packets, and each time one of the video RTP packets is received by said MCU, said MCU writes said one of the video RTP packets into one of the storage units of the video buffer based on a sequence number of said one of the video RTP packets in such a way that the video RTP packets are arranged sequentially in the video buffer.

19. The server system according to claim 11, wherein said MCU determines whether the audio RTP packets conform to an internet speech audio codec (ISAC) format, and discards the audio RTP packets that do not conform with the ISAC format.

* * * * *